(12) United States Patent
Bhat et al.

(10) Patent No.: US 11,798,737 B2
(45) Date of Patent: *Oct. 24, 2023

(54) CHARGING PAD AND A METHOD FOR CHARGING ONE OR MORE RECEIVER DEVICES

(71) Applicant: General Electric Company, Schenectady, NY (US)

(72) Inventors: Suma Memana Narayana Bhat, Bangalore (IN); Deepak Aravind, Bangalore (IN); Somakumar Ramachandrapanicker, Bangalore (IN); Arun Kumar Raghunathan, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/541,891

(22) Filed: Dec. 3, 2021

(65) Prior Publication Data

US 2022/0094206 A1 Mar. 24, 2022

Related U.S. Application Data

(63) Continuation of application No. 16/469,538, filed as application No. PCT/US2017/058641 on Oct. 27, 2017, now Pat. No. 11,223,240.

(30) Foreign Application Priority Data

Dec. 15, 2016 (IN) .............................. 201641042699

(51) Int. Cl.
*H02J 50/40* (2016.01)
*H01F 38/14* (2006.01)
(Continued)

(52) U.S. Cl.
CPC ............ *H01F 38/14* (2013.01); *H02J 7/0042* (2013.01); *H02J 50/12* (2016.02); *H02J 50/40* (2016.02)

(58) Field of Classification Search
CPC ......... H01F 38/14; H02J 7/0042; H02J 50/12; H02J 50/40
See application file for complete search history.

(56) References Cited

U.S. PATENT DOCUMENTS 5,896,278 A * 4/1999 Tamura .................. H02J 50/12
363/20
6,456,183 B1 9/2002 Basteres et al.
(Continued)

OTHER PUBLICATIONS

"India Application No. 201641042699 Examination Report", dated Aug. 21, 2019, 5 pages.
(Continued)

*Primary Examiner* — Nghia M Doan
(74) *Attorney, Agent, or Firm* — DELIZIO, PEACOCK, LEWIN & GUERRA; John F. Guerra

(57) ABSTRACT

A charging pad for charging one or more receiver devices is disclosed. The charging pad includes a power drive unit configured to generate a first AC voltage signal having a first frequency and a second AC voltage signal having a second frequency. Further, the charging pad includes a transmitting unit including a single power exchange coil coupled to the power drive unit, wherein the single power exchange coil includes a first coil segment configured to transmit the first AC voltage signal having the first frequency when the first AC voltage signal is received from the power drive unit. Also, the single power exchange coil includes a second coil segment configured to transmit the second AC voltage signal having the second frequency when the second AC voltage signal is received from the power drive unit.

20 Claims, 9 Drawing Sheets

(51) Int. Cl.
*H02J 50/12* (2016.01)
*H02J 7/00* (2006.01)

(56) References Cited

U.S. PATENT DOCUMENTS

| | | | |
|---|---|---|---|
| 8,933,583 B2 | 1/2015 | Uchida | |
| 10,170,933 B2* | 1/2019 | Kang | H02J 50/402 |
| 11,081,900 B2* | 8/2021 | Kanakasabai | H02J 50/12 |
| 2010/0270867 A1* | 10/2010 | Abe | H02J 50/60 |
| | | | 307/104 |
| 2011/0051308 A1 | 3/2011 | Chan | |
| 2013/0154558 A1 | 6/2013 | Lee et al. | |
| 2013/0200717 A1 | 8/2013 | Bourilkov et al. | |
| 2015/0061586 A1 | 3/2015 | Cheikh et al. | |
| 2015/0280448 A1 | 10/2015 | White, II | |
| 2016/0064949 A1 | 3/2016 | Bai et al. | |
| 2016/0164332 A1 | 6/2016 | Elkhouly et al. | |
| 2016/0181855 A1 | 6/2016 | Muurinen et al. | |
| 2016/0322850 A1 | 11/2016 | Yeh et al. | |
| 2017/0237292 A1* | 8/2017 | Jeong | H04B 5/0037 |
| | | | 307/104 |
| 2020/0083753 A1 | 3/2020 | Bhat et al. | |

OTHER PUBLICATIONS

"PCT Application No. PCT/US2017/058641 International Search Report and Written Opinion", dated Feb. 21, 2018, 10 pages.

"The Qi Wireless Power Transfer Power Class 0 Specification", Qi Wireless Power Consortium, Parts 1 and 2: Interface Definitions, Version 1.2.2, Apr. 2016, 160 pages.

"The Qi Wireless Power Transfer Power Class 0 Specification", Qi Wireless Power Consortium, Part 4: Reference Designs, Version 1.2.2, Apr. 2016, 310 pages.

"U.S. Appl. No. 16/469,538 Office Action", dated Mar. 18, 2021, 8 pages.

\* cited by examiner

CHARGING PAD AND A METHOD FOR CHARGING ONE OR MORE RECEIVER DEVICES

RELATED APPLICATIONS

This Patent Application is a continuation of U.S. application Ser. No. 16/469,538, filed Jun. 13, 2019, which is a national stage of International Application No. PCT/US2017/058641, filed Oct. 27, 2017, and claims the priority benefit of India Patent Application No. 201641042699, filed Dec. 15, 2016. The disclosures of the prior Applications are considered part of and incorporated by reference in this Patent Application.

BACKGROUND

Embodiments of the present invention relate generally to wireless power transfer systems and more particularly to a system and a method for charging at least one receiver device using a single power exchange coil.

Power transfer system are widely used to transfer power from a power source to one or more receiver devices, such as for example, mobile devices, biomedical devices, and portable consumer devices. Typically, the power transfer systems may be contact based power transfer systems or wireless power transfer systems. In certain applications, where instantaneous or continuous power transfer is required but interconnecting wires are inconvenient, wireless power transfer systems are desirable.

In wireless power transfer systems, a charging device is used to convert an input power to a transferrable power which is transmitted to charge one or more loads such as batteries in one or more receiver devices. The one or more receiver devices are compatible with one or more of the wireless frequency standards. For example, there are currently three competing frequency standards: the Alliance for Wireless Power (A4WP) standard, the Wireless Power Consortium (WPC) standard, and the Power Matters Alliance (PMA) standard. The WPC standard (Qi) may be defined in a frequency range of 100 kHz to 200 kHz. The PMA standard may be defined in a frequency range of 200 kHz to 400 kHz. Further, the A4WP standard may be defined at a frequency of about 7 MHz. A conventional charging device transmits the input power at only one frequency standard irrespective of the type of the receiver device.

Accordingly, there is a need for an improved system and method for charging one or more receiver devices operating at different frequency standards.

BRIEF DESCRIPTION

In accordance with one embodiment of the present invention, a charging pad is disclosed. The charging pad includes a power drive unit configured to generate a first AC voltage signal having a first frequency and a second AC voltage signal having a second frequency. Further, the charging pad includes a transmitting unit including a single power exchange coil coupled to the power drive unit. The single power exchange coil includes a first coil segment configured to excite at the first frequency to transmit the first AC voltage signal having the first frequency when the first AC voltage signal having the first frequency is received from the power drive unit. Also, the single power exchange coil includes a second coil segment configured to excite at the second frequency to transmit the second AC voltage signal having the second frequency when the second AC voltage signal having the second frequency is received from the power drive unit.

In accordance with another embodiment of the present invention, a wireless charging device is disclosed. The wireless charging device includes a charging pad including a power drive unit configured to generate a first AC voltage signal having a first frequency and a second AC voltage signal having a second frequency. Also, the charging pad includes a transmitting unit including a single power exchange coil coupled to the power drive unit. The single power exchange coil includes a first coil segment configured to excite at the first frequency to transmit the first AC voltage signal having the first frequency when the first AC voltage signal having the first frequency is received from the power drive unit. Further, the single power exchange coil includes a second coil segment configured to excite at the second frequency to transmit the second AC voltage signal having the second frequency when the second AC voltage signal having the second frequency is received from the power drive unit. In addition, the wireless charging device includes a control unit operatively coupled to the power drive unit and configured to control a voltage gain of the power drive unit.

In accordance with another embodiment of the present invention, a method for charging at least one receiver device is disclosed. The method includes generating, by a power drive unit, a first AC voltage signal having a first frequency and a second AC voltage signal having a second frequency. Also, the method includes exciting a first coil segment of a single power exchange coil, at the first frequency, when the first AC voltage signal having the first frequency is received from the power drive unit, to transmit the first AC voltage signal having the first frequency to charge a first receiver device. Further, the method includes exciting a second coil segment of the single power exchange coil, at the second frequency, when the second AC voltage signal having the second frequency is received from the power drive unit, to transmit the second AC voltage signal having the second frequency to charge a second receiver device.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As will be described in detail hereinafter, various embodiments of a system and method for charging one or more wireless receiver devices are disclosed. In particular, embodiments of the system and method disclosed herein employ a single power exchange coil capable of transmitting voltage signals having different frequencies, thereby enabling charging of the one or more wireless receiver devices operating at different frequency standards.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. The use of terms "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, terms "circuit" and "circuitry" and "control unit" may include either a single component or a plurality of components, which are either active and/or passive and are connected or otherwise coupled together to provide the described function. In addition, the term operationally coupled as used herein includes wired coupling, wireless coupling, electrical coupling, magnetic coupling, radio communication, software based communication, or combinations thereof.

Figure 1:
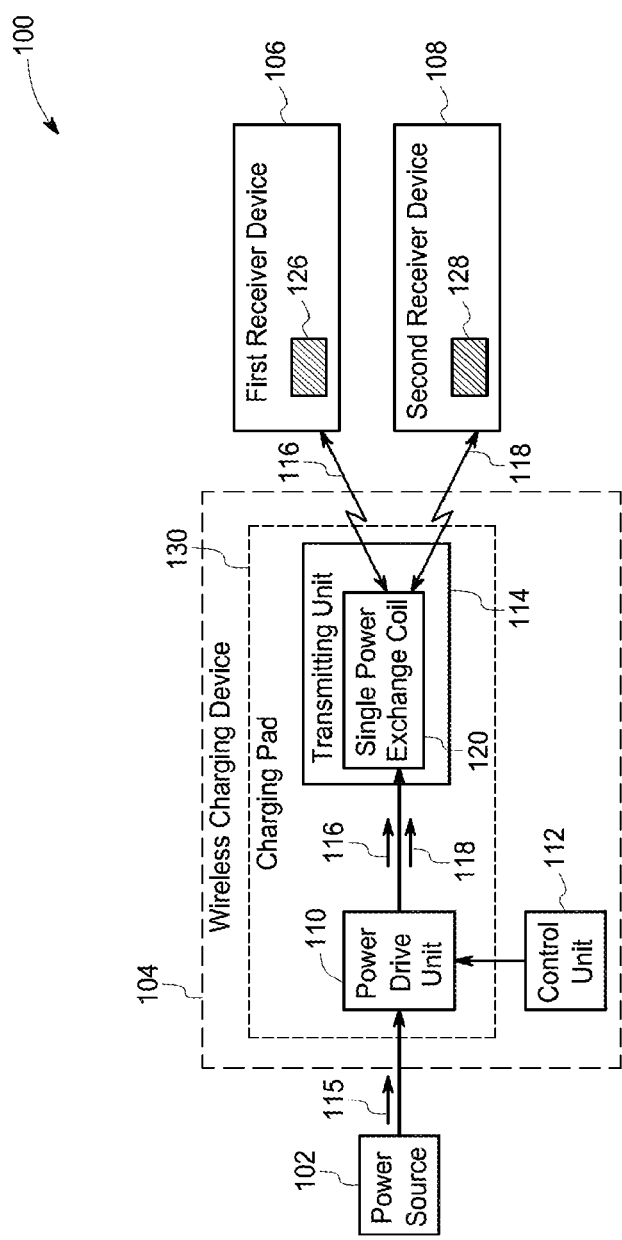
FIG. 1 is a block diagram representation of a wireless power transfer system in accordance with an embodiment of the present invention.

FIG. 1 is a diagrammatical representation of a wireless power transfer system 100 in accordance with an embodiment of the present invention. The wireless power transfer system 100 includes a power source 102, a wireless charging device 104, a first receiver device 106, and a second receiver device 108. The first and second receiver devices 106, 108 may include mobile devices, biomedical devices, portable consumer devices, or the like. For example, receiver devices 106, 108 may include cell phones, laptops, heating ventilation and air-conditioning (HVAC) units, or the like. The wireless charging device 104 is wirelessly coupled to the first receiver device 106 and the second receiver device 108. The wireless charging device 104 is used to transmit electric power from the power source 102 to the first and second receiver devices 106, 108. In one embodiment, the wireless power transfer system 100 may be referred to as a contactless power transfer system.

The first and second receiver devices 106, 108 are compatible with one of the wireless frequency standards. For example, one of the receiver devices 106, 108 may be compatible with Alliance for Wireless Power (A4WP) standard defined at a frequency of about 7 MHz. Similarly, another receiver device may be compatible with Wireless Power Consortium (WPC) standard (Qi) defined in a frequency range of 100 kHz to 200 kHz. In certain embodiments, one of the receiver devices 106, 108 may be compatible with Power Matters Alliance (PMA) standard that is defined in a frequency range of 200 kHz to 400 kHz. The other receiver device may be compatible with Air Fuel Alliance standard defined at a frequency of about 6.7 MHz. In the illustrated embodiment of the invention, the first receiver device 106 is considered to be compatible with a first frequency standard such as Air Fuel Alliance standard defined at a frequency of about 6.7 MHz. The first frequency standard is referred to as a high frequency standard. Similarly, the second receiver device 108 is considered to be compatible with a second frequency standard such as WPC standard defined in a frequency range of 100 kHz to 200 kHz. The second frequency standard is referred to as a low frequency standard. It should be noted herein that the receiver devices 106, 108 may be compatible with any frequency standard and are not limited to the frequency standards mentioned herein. Further, the use of any number of receiver devices that are compatible with any number of frequency standards may be envisioned.

In conventional power transfer systems that are compatible with different frequency standards, a charging device may not supply power to each of the receiver devices at the corresponding frequency standard. In one of the conventional power transfer systems, separate charging devices having separate converters and separate power exchange coils for each frequency standard, are employed to supply power to the corresponding receiver device. The use of such separate charging devices for each frequency standard may substantially increase cost of the conventional power transfer systems.

To overcome the problems/drawbacks associated with the conventional systems, the exemplary power transfer system 100 includes the wireless charging device 104 that is configured to charge the first and second receiver devices 106, 108 operable at different corresponding frequency standards. The wireless charging device 104 includes a charging pad 130 and a control unit 112. The charging pad 130 is referred to as an electrical enclosure upon which the one or more receiver devices may be placed for charging the one or more receiver devices. In one embodiment, the control unit 112 may be positioned within the charging pad 130. In another embodiment, the control unit 112 may be positioned external to the charging pad 130. The control unit 112 is used to drive the charging pad 130 to generate voltage signals having different frequencies.

Further, the charging pad 130 includes a power drive unit 110 and a transmitting unit 114. The power drive unit 110 is electrically coupled to the power source 102 and the control unit 112. The power source 102 is configured to supply input power having a direct current (DC) voltage signal 115 to the power drive unit 110. In some embodiments, the input power may be in a range from about 0.1 W to 200 W. In one embodiment, the power source 102 may be a part of the wireless charging device 104. In another embodiment, the power source 102 may be positioned external to the wireless charging device 104. Further, the control unit 112 is used to control a voltage gain of the power drive unit 110.

The power drive unit 110 is configured to generate a first (alternating current) AC voltage signal 116 having the first frequency and a second AC voltage signal 118 having the second frequency. It may be noted that the first frequency may be referred to as a frequency in a first frequency band in a range from about 2 MHz to about 9 MHz. The second frequency may be referred to as a frequency in the second frequency band in a range from about 10 kHz to about 1 MHz. Also, it may be noted that the terms "first frequency" and "frequency in a first frequency band" may be used interchangeably in the specification. Similarly, the terms "second frequency" and "frequency in a second frequency band" may be used interchangeably in the specification.

The power drive unit 110 is further configured to transmit the input power having the first AC voltage signal 116 and the second AC voltage signal 118 to the transmitting unit 114. In the exemplary embodiment, the transmitting unit 114 includes a single power exchange coil 120 electrically coupled to the power drive unit 110 and inductively coupled to the first and second receiver devices 106, 108. In one embodiment, the single power exchange coil 120 include a plurality of coil segments (shown in FIG. 2) disposed one above the other. In another embodiment, the coil segments may be positioned side-by-side. The single power exchange coil 120 is used to wirelessly transmit the input power having the first AC voltage signal 116 and the second AC voltage signal 118 to the first and second receiver devices 106, 108.

Further, the first AC voltage signal 116 having the first frequency and the second AC voltage signal 118 having the second frequency is used for charging electric loads 126, 128, for example, batteries of the first and second receiver devices 106, 108 respectively. In one embodiment, if the first receiver device 106 is compatible with the first frequency standard such as Air Fuel Alliance standard, the first receiver device 106 is configured to receive the first AC voltage signal 116 having the first frequency from one coil segment of the single power exchange coil 120. Similarly, if the second receiver device 108 is compatible with a second frequency standard such as WPC standard, the second receiver device 108 is configured to receive the second AC voltage signal 118 having the second frequency from another coil segment of the single power exchange coil 120. The first and second receiver devices 106, 108 may be placed on or proximate to the charging pad 130 for charging the electric loads, 126, 128 of the first and second receiver devices 106, 108 respectively.

Figure 2:
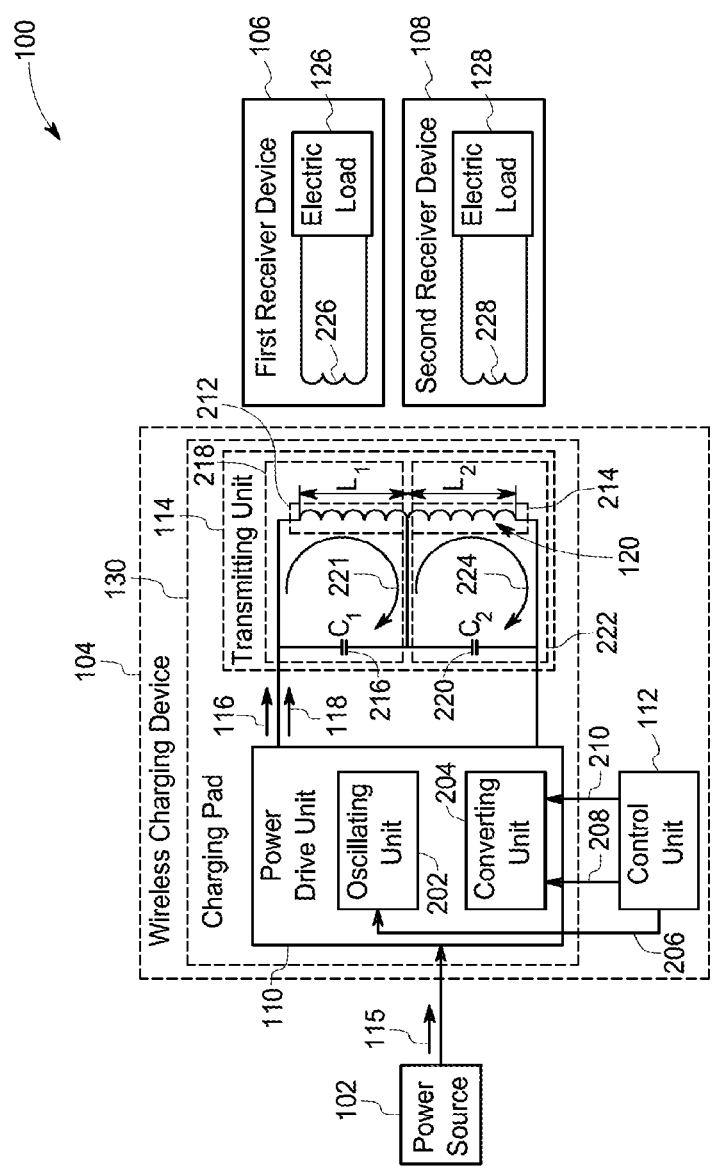
FIG. 2 is a schematic representation of a wireless power transfer system in accordance with one embodiment of the present invention.

Referring to FIG. 2, a detailed schematic representation of the wireless power transfer system 100 in accordance with an embodiment of the present invention is depicted. The power drive unit 110 includes an oscillating unit 202 and a converting unit 204. In one embodiment, the oscillating unit 202 may include one or more oscillators that are pre-tuned or designed to oscillate at a predefined frequency. For example, one oscillator is tuned to the first frequency and configured to receive a bias voltage from the power source 102 and oscillate at the first frequency to convert the received bias voltage to the first AC voltage signal 116 having the first frequency. Similarly, another oscillator is tuned to the second frequency and configured to receive a bias voltage from the power source 102 and oscillate at the second frequency to convert the received bias voltage to the second AC voltage signal 118 having the second frequency. In certain embodiments, the oscillators may be piezo-electric oscillators or integrated circuit (IC)-based electronics oscillators. In some embodiments, the oscillating unit 202 may include other components such as amplifiers and adders (not shown) to combine the first and second AC voltage signals 116, 118 and send a combined signal to the transmitting unit 114. Further, the control unit 112 is configured to send a control signal 206 to the oscillating unit 202 to control a voltage gain of the oscillating unit 202.

In another embodiment, the converting unit 204 is configured to generate the first AC voltage signal 116 having the first frequency and the second AC voltage signal 118 having the second frequency. In one embodiment, the converting unit 204 includes a hybrid (H)-bridge converter (not shown) electrically coupled to the control unit 112 and the power source 102. If a first frequency control signal 208 is received from the control unit 112, the H-bridge converter is configured to convert the DC voltage signal 115 of the input power to the first AC voltage signal 116 having the first frequency. If a second frequency control signal 210 is received from the control unit 112, the H-bridge converter is configured to convert the DC voltage signal 115 of the input power to the second AC voltage signal 118 having the second frequency. Further, the converting unit 204 is configured to transmit the first AC voltage signal 116 having the first frequency and the second AC voltage signal 118 having the second frequency to the transmitting unit 114. In some embodiments, the oscillating unit 202 and the converting unit 204 may be combined to form a unit configured to generate the first and second AC voltage signals 116, 118.

In the illustrated embodiment, the single power exchange coil 120 of the transmitting unit 114 includes a first coil segment 212 and a second coil segment 214 that are inductively coupled to the first and second receiver devices 106, 108 respectively. In one embodiment, the single power exchange coil 120 may be tapped at a predetermined location to form the first coil segment 212 and the second coil segment 214. In another embodiment, the first coil segment 212 and the second coil segment 214 may include a spiral structure, a helical structure, a conical structure, a log periodic structure, a swiss-roll structure, or a combination thereof.

If the transmitting unit 114 receives the first AC voltage signal 116 having the first frequency, the first coil segment 212 of the single power exchange coil 120 is configured to be excited to transmit the first AC voltage signal 116 having the first frequency to the first receiver device 106. In the illustrated embodiment, a first resonator 218 includes the first coil segment 212 and a first capacitor 216 parallelly coupled to the first coil segment 212. If the first AC voltage signal 116 is received, the first resonator 218 is configured to resonate at the first frequency to transmit the first AC voltage signal 116 having the first frequency. In one embodiment, the first capacitor 216 has a capacitance value $C_1$ and the first coil segment 212 has an inductance value $L_1$ such that a resonant path 221 is formed to enhance the transmission of the first AC voltage signal 116 to the first receiver device 106.

If the transmitting unit 114 receives the second AC voltage signal 118 having the second frequency, the second coil segment 214 of the single power exchange coil 120 is configured to be excited to transmit the second AC voltage signal 118 having the second frequency to the second receiver device 108. In the illustrated embodiment, a second resonator 222 includes the second coil segment 214 and a second capacitor 220 parallelly coupled to the second coil segment 214. If second AC voltage signal 118 is received, the second resonator 222 is configured to resonate at the second frequency to transmit the second AC voltage signal

118 having the second frequency. In one embodiment, the second capacitor 220 has a capacitance value $C_2$ and the second coil segment 214 has an inductance value $L_2$ such that a resonant path 224 is formed to enhance the transmission of the second AC voltage signal 118 to the second receiver device 108.

The first and second receiver devices 106, 108 are configured to use the first AC voltage signal 116 having the first frequency and the second AC voltage signal 118 having the second frequency for charging the electric loads 126, 128 of the first and second receiver devices 106, 108 respectively. The first and second receiver devices 106, 108 are inductively coupled to the first coil segment 212 and the second coil segment 214 respectively based on the frequency standards for which the first and second receiver devices 106, 108 are designed. For example, if the first receiver device 106 is configured to be compatible with the first frequency standard such as Air Fuel Alliance standard, a first receiver coil 226 of the first receiver device 106 is configured to receive the first AC voltage signal 116 having the first frequency from the first coil segment 212. Similarly, if the second receiver device 108 is configured to be compatible with the second frequency standard such as WPC standard, a second receiver coil 228 of the second receiver device 108 is configured to receive the second AC voltage signal 118 having the second frequency from the second coil segment 214.

Figure 3:
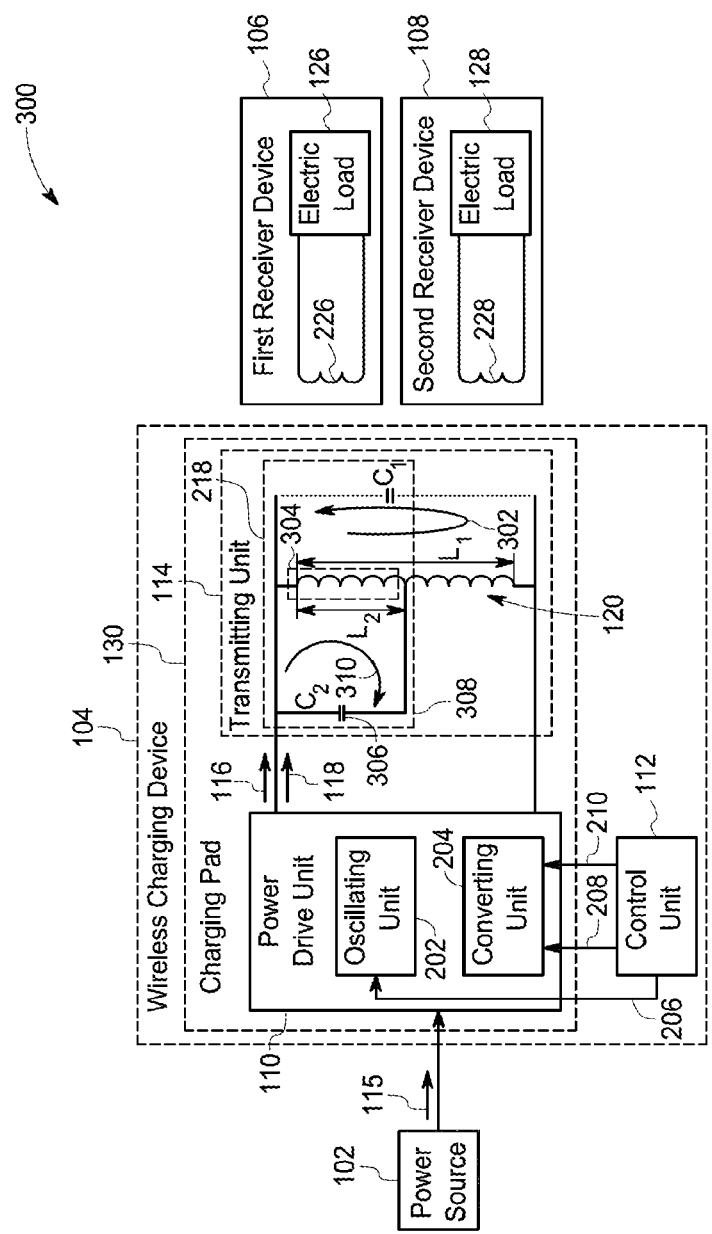
FIG. 3 is a schematic representation of a wireless power transfer system in accordance with another embodiment of the present invention.

Referring to FIG. 3, a schematic representation of a wireless power transfer system 300 in accordance with another embodiment of the present invention, is depicted. Particularly, the single power exchange coil 120 includes an internal inductance and an internal capacitance that aid in resonating the single power exchange coil 120 at the first frequency to transmit the first AC voltage signal 116 having the first frequency to the first receiver device 106. The internal capacitance may be a parasitic capacitance, a distributed capacitance, or a lumped capacitance. In the illustrated embodiment, the internal inductance and the internal capacitance of the single power exchange coil 120 is referred to as a first resonator. If the transmitting unit 114 receives the first AC voltage signal 116 having the first frequency, the first resonator is configured to resonate at the first frequency to transmit the first AC voltage signal 116 having the first frequency to the first receiver device 106. The single power exchange coil 120 includes an internal capacitance value $C_1$ and the internal inductance value $L_1$ such that a resonant path 302 is formed to enhance the transmission of the first AC voltage signal 116 to the first receiver device 106.

In the illustrated embodiment, a coil segment 304 of the single power exchange coil 120 is excited to transmit the second AC voltage signal 118 having the second frequency to the second receiver device 108. The single power exchange coil 120 includes a second resonator 308 having a capacitor 306 parallelly coupled to the coil segment 304. If the second AC voltage signal 118 is received, the second resonator 308 is configured to resonate at the second frequency to transmit the second AC voltage signal 118 having the second frequency. The capacitor 306 has a capacitance value $C_2$ and the coil segment 304 has an inductance value $L_2$ such that a resonant path 310 is formed to enhance the transmission of the second AC voltage signal 118 to the second receiver device 108.

Figure 4:
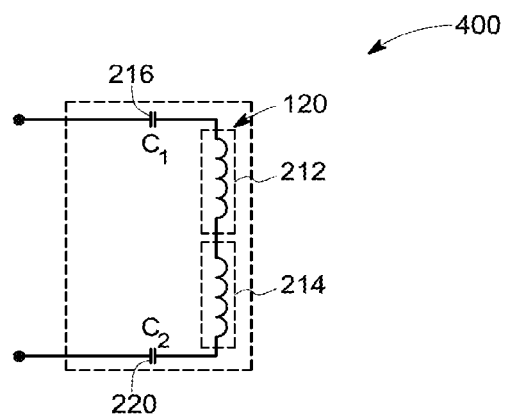
FIG. 4 is a schematic representation of a transmitting unit in accordance with another embodiment of the present invention.

Referring to FIG. 4, a schematic representation of a transmitting unit 400 in accordance with another embodiment of the present invention is depicted. The transmitting unit 400 is similar to the transmitting unit 114 of FIG. 2 except that the capacitors 216, 220 are coupled in series with the single power exchange coil 120. In particular, a first resonator includes the first coil segment 212 and the first capacitor 216 coupled in series with the first coil segment 212. Similarly, a second resonator includes the second coil segment 214 and the second capacitor 220 coupled in series with the second coil segment 214. The first resonator resonates at the first frequency to transmit the first AC voltage signal having the first frequency to the first receiver device. Similarly, the second resonator resonates at the second frequency to transmit the second AC voltage signal having the second frequency to the second receiver device.

Figure 5:
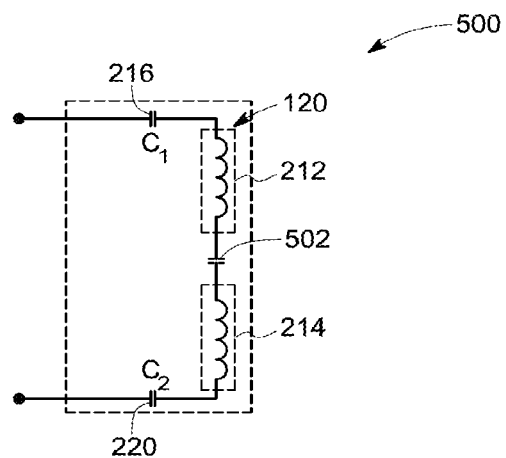
FIG. 5 is a schematic representation of a transmitting unit in accordance with another embodiment of the present invention.

Referring to FIG. 5, a schematic representation of a transmitting unit 500 in accordance with another embodiment of the present invention is depicted. The transmitting unit 500 is similar to the transmitting unit 400 except that the first coil segment 212 and the second coil segment 214 are coupled to each other using an internal capacitance 502. The internal capacitance 502 may be a distributed capacitance or a parasitic capacitance of the single power exchange coil 120.

Figure 6:
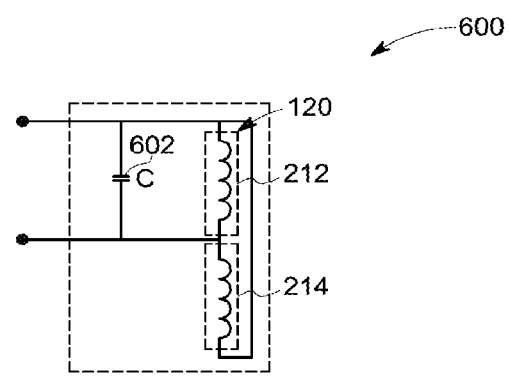
FIG. 6 is a schematic representation of a transmitting unit in accordance with another embodiment of the present invention.

FIG. 6 is a schematic representation of a transmitting unit 600 in accordance with another embodiment of the present invention. The transmitting unit 600 includes a single capacitor 602 coupled to the first coil segment 212 and the second coil segment 214. In the illustrated embodiment, a first resonator includes the first coil segment 212 and the single capacitor 602 coupled to the first coil segment 212 and configured to transmit the first AC voltage signal having the first frequency. A second resonator includes the second coil segment 214 and the single capacitor 602 coupled to the second coil segment 214 and configured to transmit the second AC voltage signal having the second frequency.

Figure 7:
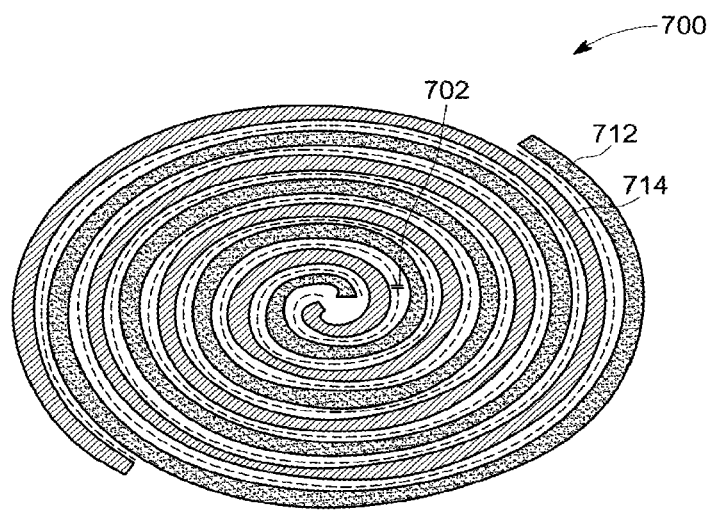
FIG. 7 is a diagrammatical representation of a single power exchange coil in accordance with another embodiment of the present invention.

Referring to FIG. 7, a diagrammatical representation of a single power exchange coil 700 in accordance with another embodiment of the present invention is depicted. The single power exchange coil 700 includes a first coil segment 712 and a second coil segment 714 interwound spirally to form a swiss roll structure. Further, the first coil segment 712 and the second coil segment 714 are coupled to each other using a distributed capacitance 702.

Figure 8:
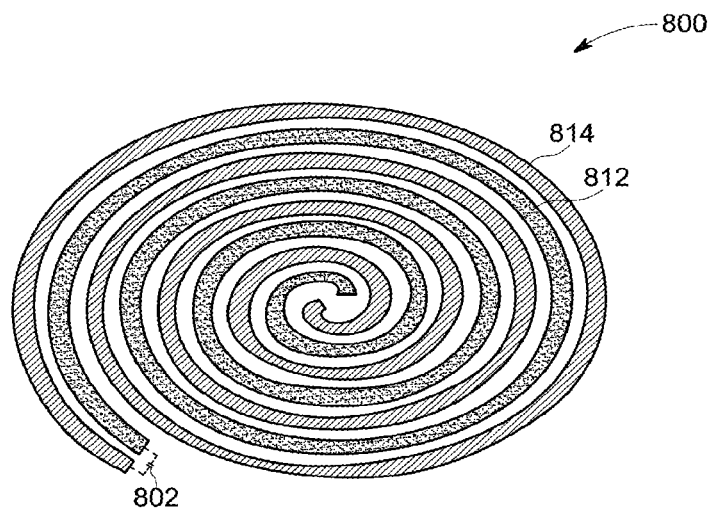
FIG. 8 is a diagrammatical representation of a single power exchange coil in accordance with another embodiment of the present invention.

Referring to FIG. 8, a diagrammatical representation of a single power exchange coil 120 in accordance with another embodiment of the present invention is depicted. The single power exchange coil 800 includes a first coil segment 812 having one end connected to one end of a second coil segment 814 using a capacitor 802.

Figure 9:
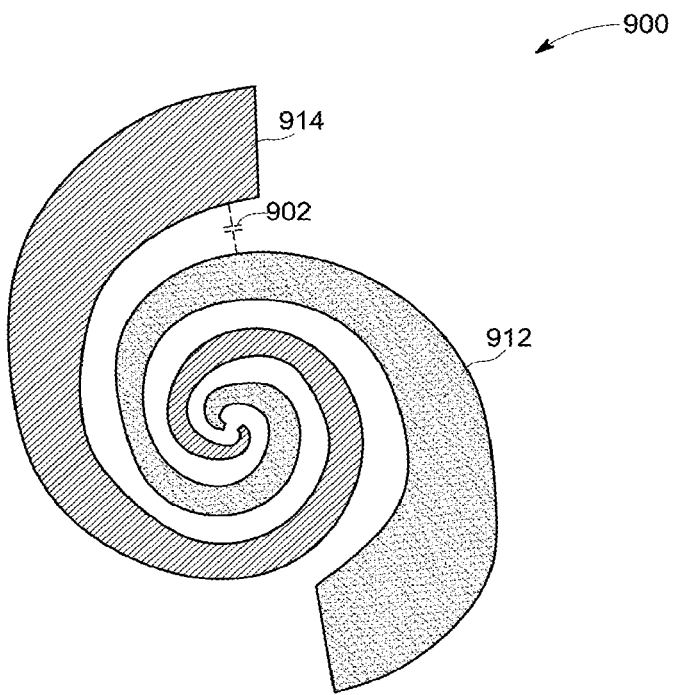
FIG. 9 is a diagrammatical representation of a single power exchange coil in accordance with another embodiment of the present invention.

Referring to FIG. 9, a diagrammatical representation of a single power exchange coil 900 in accordance with another embodiment of the present invention is depicted. The single power exchange coil 900 includes a first coil segment 912 and a second coil segment 914 that are arranged in the form of logs interwound spirally to form a swiss roll structure. The coils segments 912, 914 are connected to each other using a capacitor 902.

Figure 10:
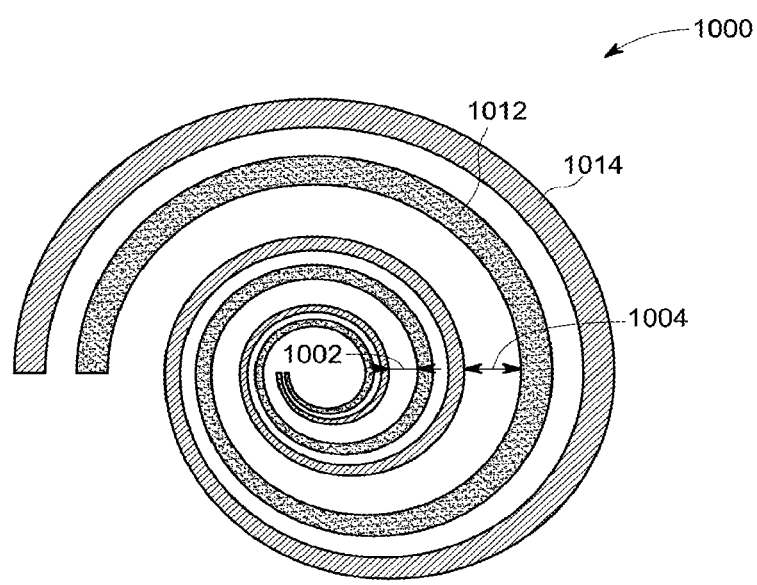
FIG. 10 is a diagrammatical representation of a single power exchange coil in accordance with another embodiment of the present invention.

Referring to FIG. 10, a diagrammatical representation of a single power exchange coil 1000 in accordance with another embodiment of the present invention is depicted. The single power exchange coil 1000 includes a first coil segment 1012 and a second coil segment 1014 having different pitches 1002, 1004. A pitch is defined as a space between the coils segments when the coils segments are interwound spirally to form a swiss roll structure. In the illustrated embodiment, the first and second coil segments 1012, 1014 have a first pitch $P_1$ 1002 at one end and a second pitch $P_2$ 1004 at another end. The first pitch $P_1$ 1002 is less than the second pitch $P_2$ 1004.

Figure 11:
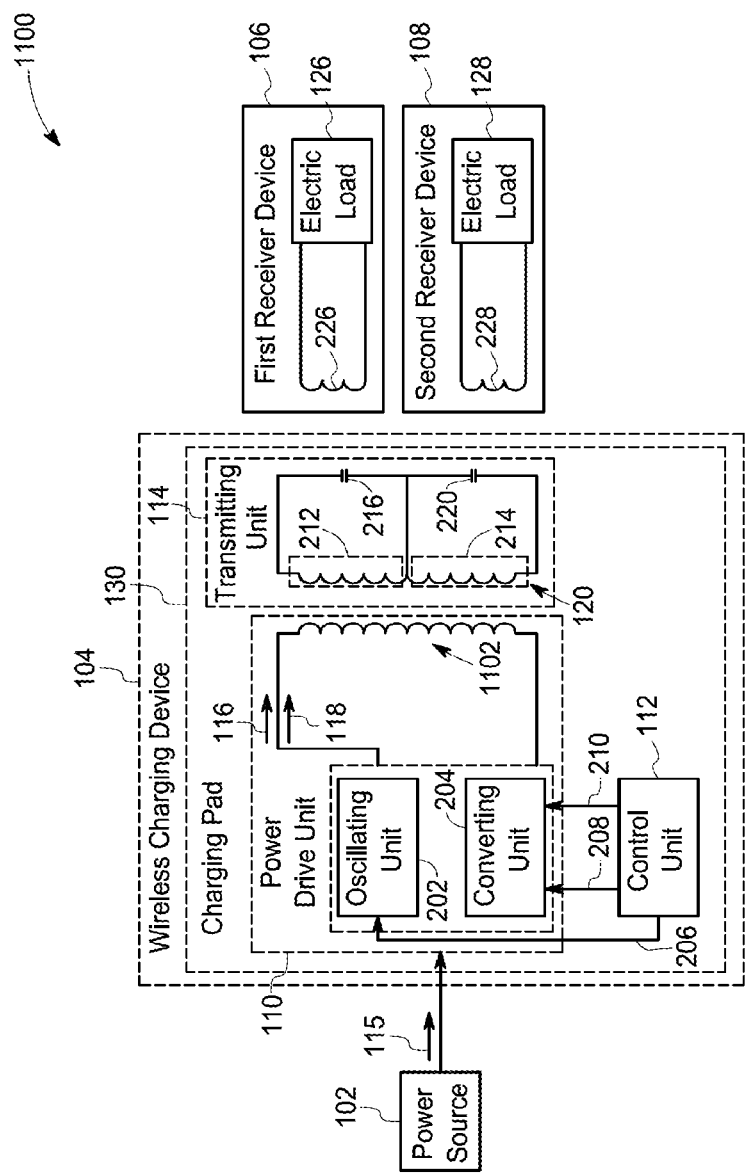
FIG. 11 is a schematic representation of a wireless power transfer system in accordance with another embodiment of the present invention.

Referring to FIG. 11, a schematic representation of a wireless power transfer system 1100 in accordance with another embodiment of the present invention is depicted. The wireless power transfer system 1100 is similar to the wireless power transfer system 100 of FIG. 2 except that the power drive unit 110 includes a drive coil 1102 that is magnetically or electromagnetically coupled to the single power exchange coil 120 of the transmitting unit 114. More specifically, the drive coil 1102 is coupled to at least one of the oscillating unit 202 and the converting unit 204 of the power drive unit 110. If the drive coil 1102 transmits the first AC voltage signal having the first frequency, the first coil segment 212 is configured to resonate at the first frequency to transmit the first AC voltage signal to the receiver coil 226 of the first receiver device 106. If the drive coil 1102 transmits the second voltage signal having the second frequency, the second coil segment 214 is configured to resonate at the second frequency to transmit this second AC voltage signal to the receiver coil 228 of the second receiver device 108.

Figure 12:
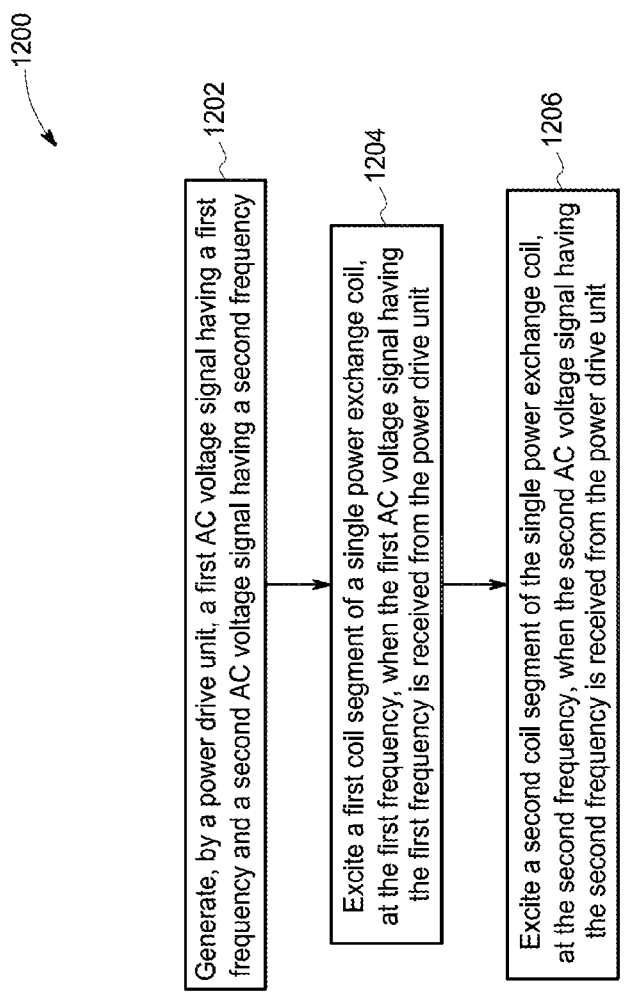
FIG. 12 is a flow chart illustrating a method for charging one or more receiver devices using a single power exchange coil in accordance with an embodiment of the present invention.

Referring to FIG. 12, a flow chart illustrating a method 1200 for charging one or more receiver devices, using a single power exchange coil in accordance with an embodiment of the present invention is depicted. At step 1202, a power drive unit generates a first AC voltage signal having a first frequency and a second AC voltage signal having a second frequency. In one embodiment, the first frequency may be in a range from about 2 MHz to about 9 MHz. The second frequency may be in a range from about 10 kHz to about 1 MHz. Further, the power drive unit transmits the first AC voltage signal having the first frequency and the second AC voltage signal having the second frequency to a transmitting unit.

Further, at step 1204, a first coil segment of a single power exchange coil of a transmitting unit is excited at the first frequency when the first AC voltage signal having the first frequency is received from the power drive unit. Particularly, a first resonator includes the first coil segment and a first capacitor coupled parallelly to the first coil segment. Further, if the first AC voltage signal is received, the first resonator resonates at the first frequency to transmit the first AC voltage signal having the first frequency to a first receiver device.

At step 1206, a second coil segment of the single power exchange coil is excited at the second frequency when the second AC voltage signal having the second frequency is received from the power drive unit. Particularly, a second resonator includes the segment coil segment and a second capacitor coupled parallelly to the second coil segment. If the second AC voltage signal is received, the second resonator resonates at the second frequency to transmit the second AC voltage signal having the second frequency to a second receiver device.

In accordance with the exemplary embodiments discussed herein, the exemplary system and method facilitate to charge one or more receiver devices of different frequency standards, using a single power exchange coil of a charging pad. As a result, set-up cost and maintenance cost of the exemplary power transfer system is substantially reduced.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A charging pad comprising:
a power drive unit comprising:
a signal generator capable of generating a first AC voltage signal having a first frequency and a second AC voltage signal having a second frequency different from the first frequency, and
an adder configured to combine the first AC voltage signal and the second AC voltage signal to create a combined AC voltage signal; and
a transmitting unit coupled to the power drive unit, the transmitting unit comprising a power exchange coil configured to:
receive the combined AC voltage signal from the power drive unit;
transmit, via a first coil segment of the power exchange coil, the first AC voltage signal having the first frequency; and
transmit, via a second coil segment of the power exchange coil, the second AC voltage signal having the second frequency.

2. The charging pad of claim 1, wherein the transmitting unit further comprises a first resonator comprising the first coil segment and a first capacitor coupled to the first coil segment, and wherein the first resonator is configured to resonate at the first frequency to transmit the first AC voltage signal having the first frequency.

3. The charging pad of claim 2, wherein the transmitting unit further comprises a second resonator comprising the second coil segment and a second capacitor coupled to the second coil segment, and wherein the second resonator is configured to resonate at the second frequency to transmit the second AC voltage signal having the second frequency.

4. The charging pad of claim 1, wherein the power exchange coil has a distributed inductance and a distributed capacitance, wherein the power exchange coil is configured to resonate at the first frequency to transmit the first AC voltage signal having the first frequency.

5. The charging pad of claim 1, wherein the first coil segment is configured to inductively transmit the first AC voltage signal having the first frequency to a first receiver device.

6. The charging pad of claim 5, wherein the second coil segment is configured to inductively transmit the second AC voltage signal having the second frequency to a second receiver device.

7. The charging pad of claim 1, wherein the first coil segment and the second coil segment are interwound spirally to form a swiss roll structure.

8. The charging pad of claim 1, wherein the power drive unit comprises an AC voltage signal generator comprising a AC signal generator selected from the group consisting of a converting unit and an oscillating unit.

9. The charging pad of claim 1, wherein the first coil segment has a first internal capacitance and a first internal inductance such that the first coil segment is configured to excite at the first frequency to transmit the first AC voltage signal having the first frequency and wherein the second coil segment has a second internal capacitance and a second internal inductance such that the second coil segment is configured to excite at the second frequency to transmit the second AC voltage signal having the second frequency.

10. A wireless charging device comprising:
a charging pad comprising:
a power drive unit capable of generating a first AC voltage signal having a first frequency and a second AC voltage signal having a second frequency, the power drive unit including an adder configured to combine the first AC voltage signal and the second AC voltage signal to create a combined AC voltage signal; and a transmitting unit coupled to the power drive unit, the transmitting unit comprising a power exchange coil configured to:

receive, from the power drive unit, the combined AC voltage signal;

transmit, via a first coil segment of the power exchange coil, the first AC voltage signal having the first frequency; and transmit, via a second coil segment of the power exchange coil, the second AC voltage signal having the second frequency; and a control unit operatively coupled to the power drive unit and configured to control a voltage gain of the power drive unit.

11. The wireless charging device of claim 10, wherein the control unit is further configured to send at least one of a first frequency control signal and a second frequency control signal to the power drive unit.

12. The wireless charging device of claim 11, wherein the power drive unit comprises a converting unit configured to:

convert a DC voltage signal of an input power to the first AC voltage signal having the first frequency if the first frequency control signal is received from the control unit; and convert the DC voltage signal of the input power to the second AC voltage signal having the second frequency if the second frequency control signal is received from the control unit.

13. The wireless charging device of claim 10, wherein the power drive unit comprises an oscillating unit configured to generate an AC voltage comprising a voltage selected from the group consisting of the first AC voltage signal having the first frequency and the second AC voltage signal having the second frequency.

14. The wireless charging device of claim 10, wherein the transmitting unit further comprises a first resonator comprising the first coil segment and a first capacitor coupled to the first coil segment, and wherein the first resonator is configured to resonate at the first frequency to transmit the first AC voltage signal having the first frequency.

15. The wireless charging device of claim 14, wherein the transmitting unit further comprises a second resonator comprising the second coil segment and a second capacitor coupled to the second coil segment, and wherein the second resonator is configured to resonate at the second frequency to transmit the second AC voltage signal having the second frequency.

16. The wireless charging device of claim 10, wherein the power exchange coil comprises a distributed inductance and a distributed capacitance, wherein the power exchange coil is configured to resonate at the first frequency to transmit the first AC voltage signal having the first frequency.

17. The wireless charging device of claim 10, wherein the first coil segment is configured to inductively transmit the first AC voltage signal having the first frequency to a first receiver device.

18. The wireless charging device of claim 17, wherein the second coil segment is configured to inductively transmit the second AC voltage signal having the second frequency to a second receiver device.

19. The wireless charging device of claim 10, wherein the power drive unit comprises a drive coil magnetically coupled to the power exchange coil of the transmitting unit.

20. The wireless charging device of claim 10, wherein the transmitting unit is capable of transmitting the first AC voltage signal concurrently with the second AC voltage signal.

* * * * *